(12) United States Patent
Zhang et al.

(10) Patent No.: US 8,816,007 B2
(45) Date of Patent: Aug. 26, 2014

(54) PHENOL-FORMALDEHYDE POLYMER WITH CARBON NANOTUBES, A METHOD OF PRODUCING SAME, AND PRODUCTS DERIVED THEREFROM

(75) Inventors: Yaolin Zhang, Quebec (CA); Xiang-Ming Wang, Quebec (CA); Martin Feng, Vancouver (CA); Gilles Brunette, Quebec (CA); Fuyong Cheng, Orleans (CA); Benoit Simard, Orleans (CA)

(73) Assignees: FPInnovations, Pointe-Claire, Quebec (CA); National Research Council of Canada, Ottawa, Ontario (CA)

( * ) Notice: Subject to any disclaimer, the term of this patent is extended or adjusted under 35 U.S.C. 154(b) by 87 days.

(21) Appl. No.: 13/192,105

(22) Filed: Jul. 27, 2011

(65) Prior Publication Data

US 2012/0041146 A1    Feb. 16, 2012

Related U.S. Application Data

(60) Provisional application No. 61/368,307, filed on Jul. 28, 2010.

(51) Int. Cl.
| | |
|---|---|
| C08F 261/02 | (2006.01) |
| C08G 8/24 | (2006.01) |
| C08H 7/00 | (2011.01) |
| C08L 61/06 | (2006.01) |
| C08J 3/20 | (2006.01) |
| C08L 97/02 | (2006.01) |
| C08L 97/00 | (2006.01) |
| C09J 161/06 | (2006.01) |
| C09J 197/00 | (2006.01) |

(52) U.S. Cl.
CPC .. *C08J 3/20* (2013.01); *C08L 61/06* (2013.01); *C08J 2397/02* (2013.01); *C08L 97/02* (2013.01); *C08L 97/005* (2013.01); *C09J 161/06* (2013.01); *C08J 2361/18* (2013.01); *C08H 6/00* (2013.01); *C09J 197/005* (2013.01)
USPC ............................................ 525/135; 523/215

(58) Field of Classification Search
USPC ............................................ 525/135; 523/215
See application file for complete search history.

(56) References Cited

U.S. PATENT DOCUMENTS

| | | | |
|---|---|---|---|
| 3,336,243 A * | 8/1967 | Garrett ............................ | 521/88 |
| 6,432,254 B1 * | 8/2002 | Black et al. ................ | 156/307.5 |

(Continued)

FOREIGN PATENT DOCUMENTS

| | | |
|---|---|---|
| CA | 2706390 | 5/2009 |
| WO | 2009086141 A3 | 7/2009 |

OTHER PUBLICATIONS

Bahr, J. L, Tour. J. M., Highly Functionalized Carbon Nanotubes Using in Situ Generated Dizonium Compounds. Chem. Mater. 2001, 13, p. 3823-2824.

(Continued)

*Primary Examiner* — Mike M Dollinger
(74) *Attorney, Agent, or Firm* — Norton Rose Fulbright Canada LLP

(57) ABSTRACT

The present invention provides methods to functionalize and solubilize WCNT with a phenolic polymer such as a lignin or a PF resin followed by in-situ integration of this functionalized CNT in the presence of formaldehyde and phenol and/or lignin to generate either CNT-reinforced phenol-formaldehyde polymer or CNT-reinforced lignin-phenol-formaldehyde polymer in either liquid or powder form suitable as an adhesive in the manufacture of a lignocellulosic composite material such as OSB and plywood.

19 Claims, 8 Drawing Sheets

(56) References Cited

U.S. PATENT DOCUMENTS

| | | | | |
|---|---|---|---|---|
| 7,300,861 | B2* | 11/2007 | Arias | 438/597 |
| 7,304,103 | B2* | 12/2007 | Tour et al. | 523/468 |
| 7,479,516 | B2* | 1/2009 | Chen et al. | 524/495 |
| 7,691,359 | B2* | 4/2010 | Tour et al. | 423/447.2 |
| 2001/0000237 | A1* | 4/2001 | Dupre et al. | 428/528 |
| 2003/0089893 | A1 | 5/2003 | Niu et al. | |
| 2004/0206941 | A1* | 10/2004 | Gurin | 252/500 |
| 2005/0002851 | A1* | 1/2005 | McElrath et al. | 423/447.3 |
| 2005/0207963 | A1* | 9/2005 | Tour et al. | 423/447.1 |
| 2006/0035087 | A1* | 2/2006 | Yadav et al. | 428/411.1 |
| 2006/0137817 | A1* | 6/2006 | Ma et al. | 156/296 |
| 2006/0293434 | A1* | 12/2006 | Yodh et al. | 524/495 |
| 2007/0238826 | A1* | 10/2007 | Fischer et al. | 524/496 |
| 2007/0265379 | A1* | 11/2007 | Chen et al. | 524/404 |
| 2008/0275172 | A1 | 11/2008 | Wise et al. | |
| 2009/0306276 | A1* | 12/2009 | Magnet et al. | 524/556 |
| 2010/0143701 | A1 | 6/2010 | Zhu et al. | |
| 2010/0285295 | A1 | 11/2010 | Wang et al. | |

OTHER PUBLICATIONS

Wang, Q., Y. Han, Y. Wang, Y. Qin, Z-X Guo, Effect of Surfactant Structure on the Stability of Carbon Nanotubes in Aqueous Solution, J. Phys. Chem. B 2008, 112, 7227-7233.

Baughman R.H., A.A. Zakhidov, W.A. Zakhidov, Carbon nanotubes—the route towards applications, Science, 2002, 297, 787-792.

Endo M, M.S. Strano, P M Ajayan, Potential Applications of Carbon Nanotubes, Chapter 2 in Carbon Nanotubes (Eds. by A. Jorio, G. Dresselhaus, M. S. Dresselhaus, Topics Appl. Physics 111, 13-62, 2008).

Haggenmueller R., S S. Rahatekar, J. A. Fagan, J. Chun, M. L. Becker, R. R. Naik, T. Krauss, L. Carlson, J F. Kadla, P. C. Trulove, D. F. Fox, H. C. DeLong,Z. Fang, S. O. Kelley, J. W. Gilman, Comparison of the Quality of Aqueous Dispersions of Single Wall Carbon Nanotubes Using Surfactants and Biomolecules, Langmuir 2008, 24, 5070-5078.

Mathur, R.B., B.P. Singh, T.L. Dhami, Y. Kalra, N. Lal, R. Rao, A.M. Rao (2010) Influence of carbon nanotube dispersion on the mechanical properties of phenolic resin composites, Polymer Composites, 31 (2), 321-327 (Feb. 2010).

Sellers, T. Jr., Wood adhesive innovations and applications in North America, Forest Products Journal, 51, 12-22 (2001).

Seo J W, E Couteau, P Umek, K Hernadi, P Marcoux, B Lukic, Cs Miko, M Milas, R Gaal and L Forro, Synthesis and manipulation of carbon nanotubes, New Journal of Physics 5 (2003) 120.1-120.22.

Tai et al (2008) Tai, N-H., M-K Yeh, T-H Peng, Experimental study and theoretical analysis on the mechanical properties of SWNTs/ phenolic composites Composites: Pat B, 39, 926-932 (2008).

Wikipedia, the free encyclopedia, Carbon nanotube, http://en.wikipedia.org/wiki/Carbon_nanotube (2010).

Yan, Y., S. Zhao, J. Cui, S.B. Yang (2009). Grafting of aldehyde structures to single-walled carbon nanotubes for application in phenolic resin-based composites. Journal of Polymer Science, Part A: Polymer Chemistry 47(22): 6135-6144.

Zheng, L. X.; MJ O'Connell, SK Doom, XZ Liao, YH Zhao, EA Akhadov, MA Hoffbauer, BJ Roop, et al., Ultralong Single-Wall Carbon Nanotubes, Nature Materials, 3 (10): 673-676 (2004).

Igarashi, A. et al. "A Morphological Study of the Effect of Carbon Nanotube Filler on Tribology of Phenol/ Formaldehyde Resin-based Composites" Polymer Journal, 2005, 37(5), 522-528, published Jul. 15, 2005 (see Experimental section).

International Search Report, PCT/CA2011/000873, dated Sep. 27, 2011.

* cited by examiner

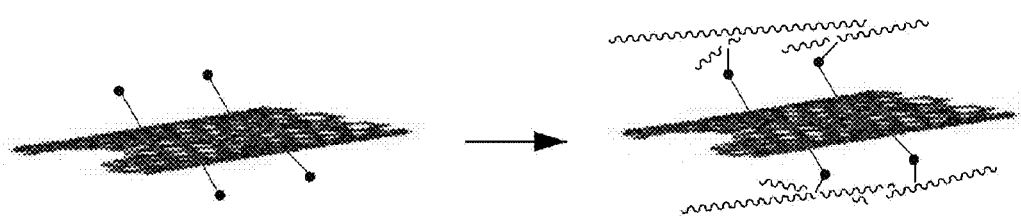
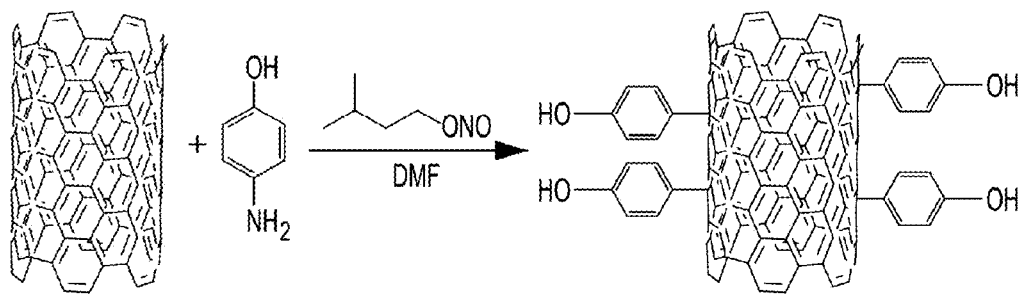
FIG. 1.1

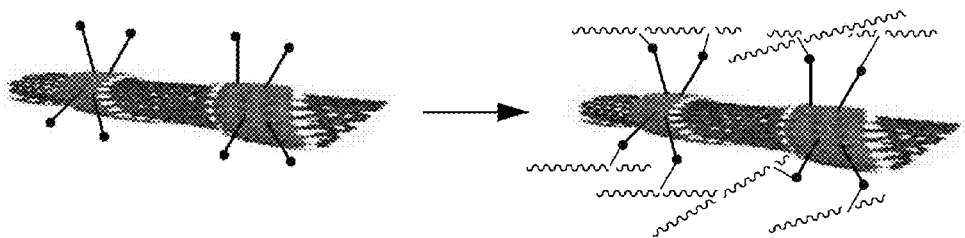
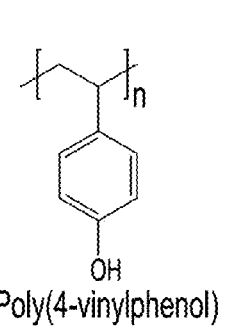
Poly(4-vinylphenol)
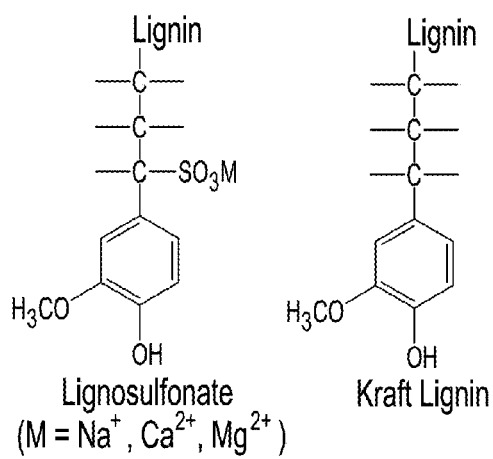
Lignosulfonate ($M = Na^+, Ca^{2+}, Mg^{2+}$)  Kraft Lignin
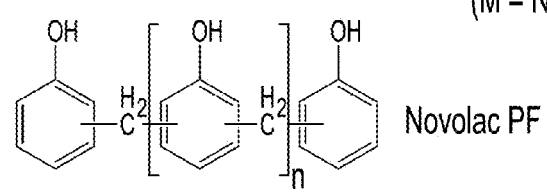
Novolac PF
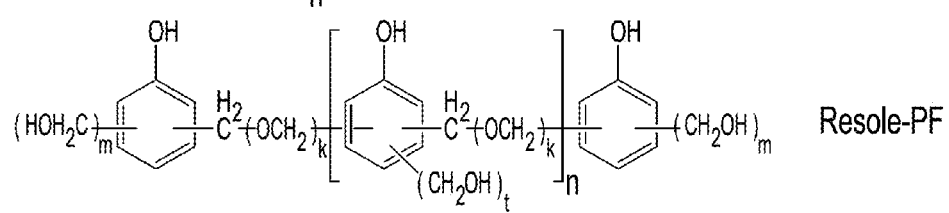
Resole-PF
FIG. 2

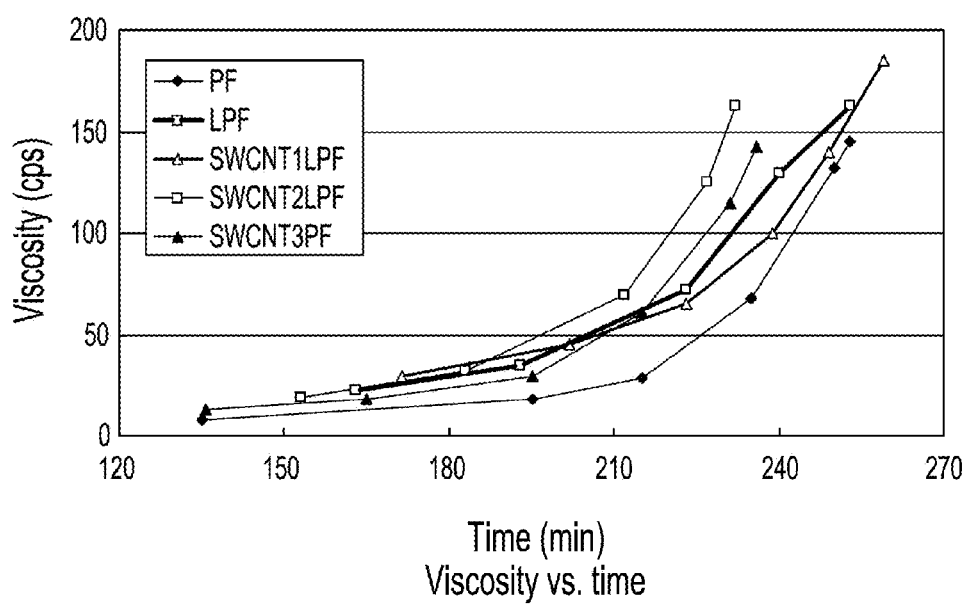
FIG. 2.1

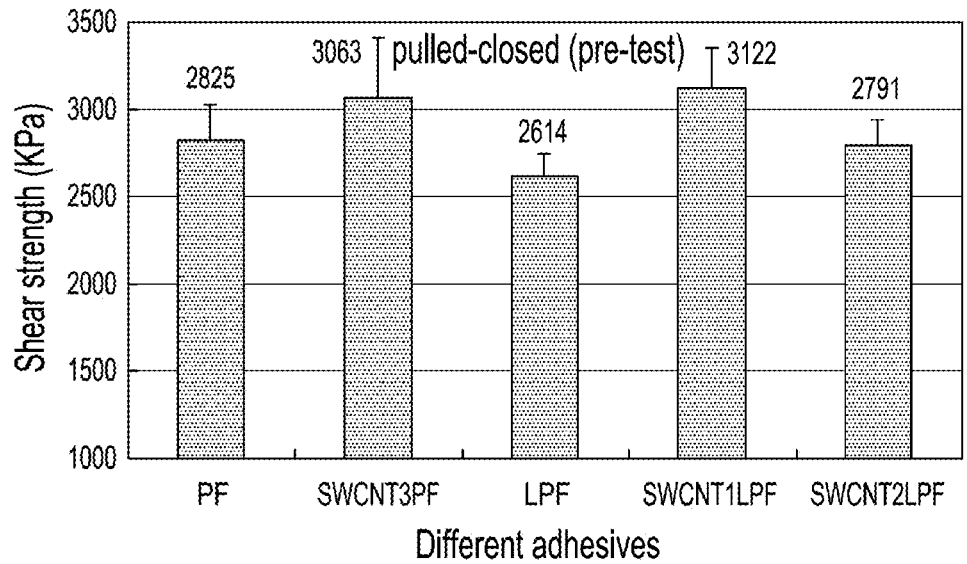
FIG. 2.2
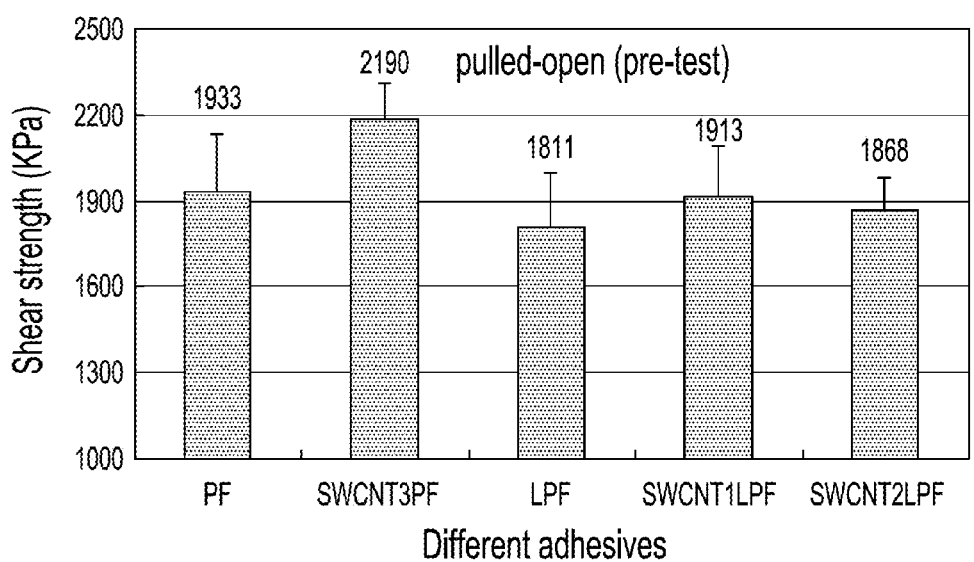
FIG. 2.3

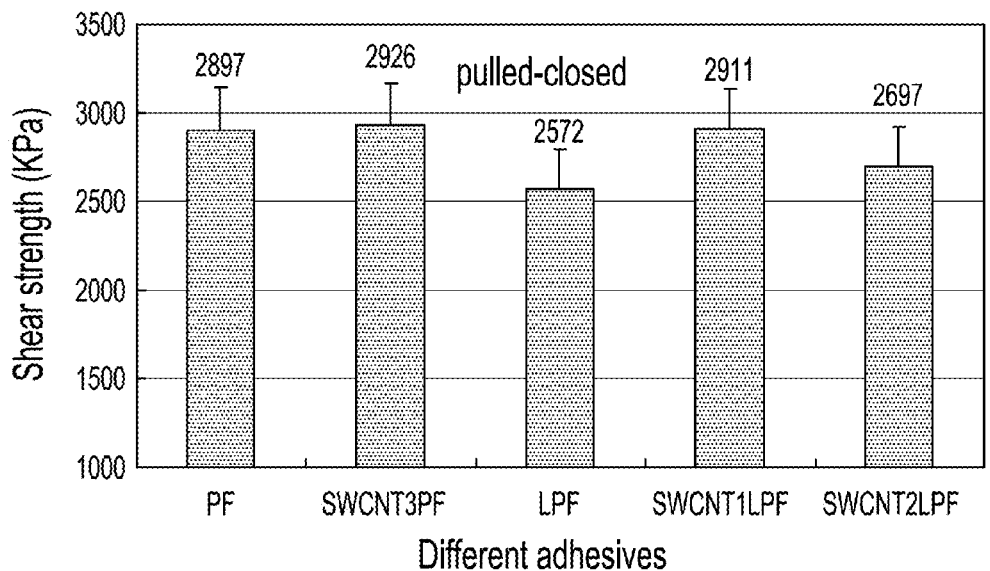
FIG. 2.4
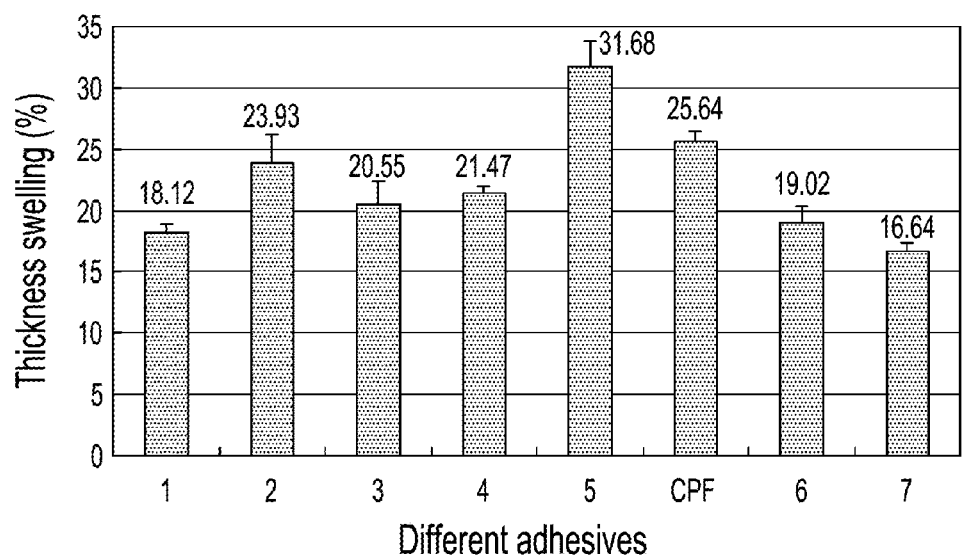
FIG. 2.5

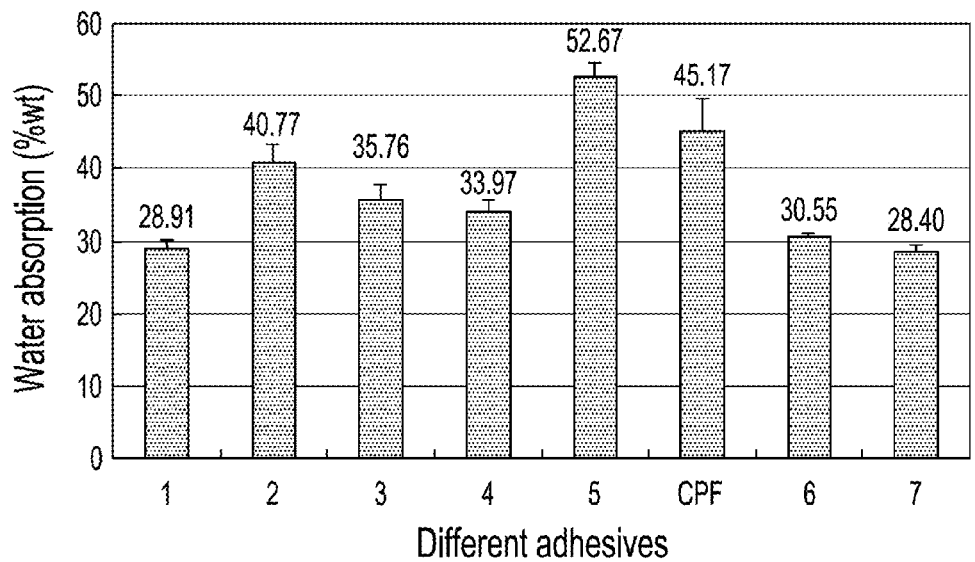
FIG. 2.6
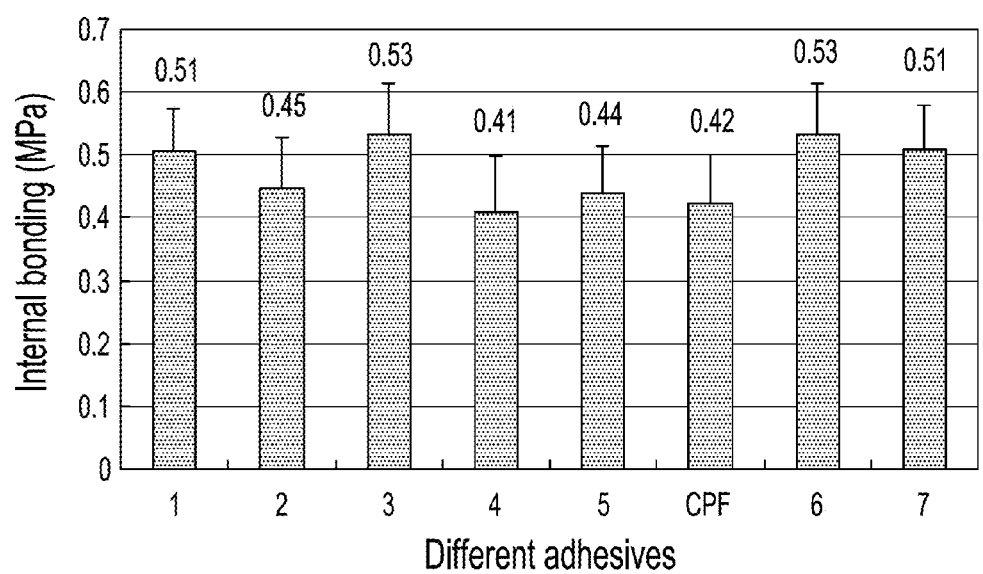
FIG. 2.7

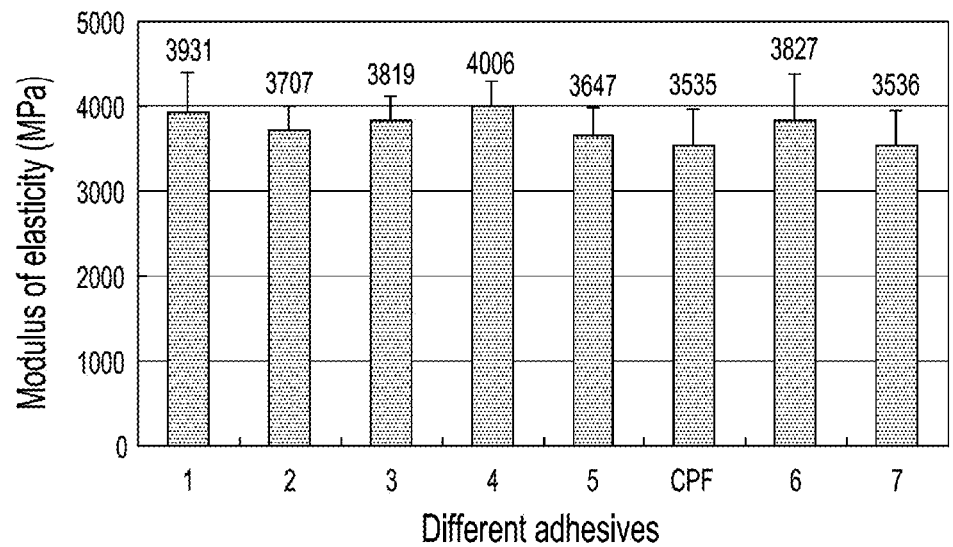
FIG. 2.8
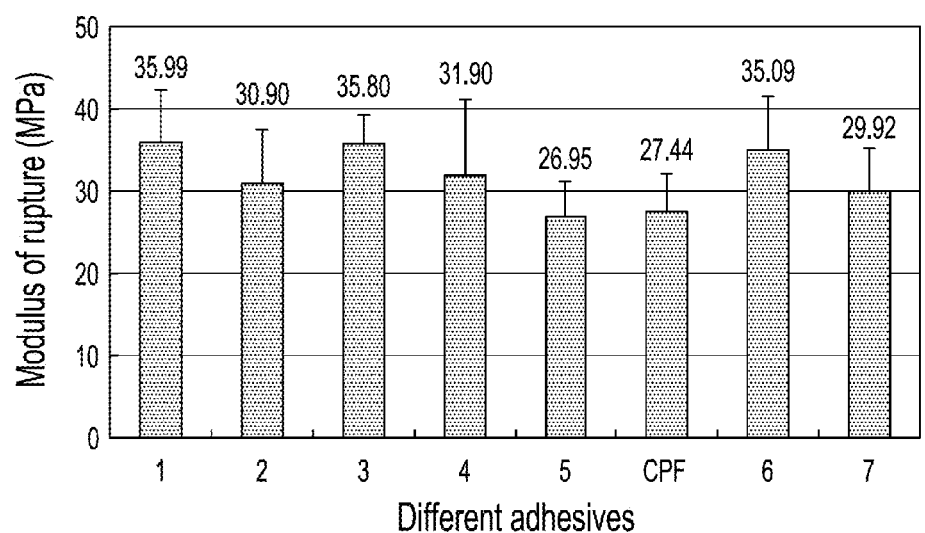
FIG. 2.9

PHENOL-FORMALDEHYDE POLYMER WITH CARBON NANOTUBES, A METHOD OF PRODUCING SAME, AND PRODUCTS DERIVED THEREFROM

CROSS-REFERENCE TO RELATED APPLICATION

This application is related to U.S. Provisional Application Ser. No. 61/368,307 filed Jul. 28, 2010 and the benefit under 35 USC 119(e) of such US Provisional Application is claimed.

FIELD OF THE INVENTION

The present invention concerns a phenol-formaldehyde polymer reinforced with carbon nanotubes, a method of making this polymer and the composite products that can be produced therefrom.

BACKGROUND OF THE INVENTION

Sustainability and the environmental neutrality are forcing manufacturers to change their production processes. This has lead to an ever increasing use of composite materials as a means (a) to optimize the use of natural resources and (b) as a way to reduce energy consumption. There are two classes of composites, a single isotropic structure designed to have the desired properties all within a single structure, or multiple layers of an isotropic composite in which each layer is designed to perform a specific function i.e., a multi functional composite. Irrespective of the type of composite carbon nanotubes (CNT) are seen as a material that can contribute to providing the desired property for both types of composite.

Carbon nanotubes (CNT or CNTs) are an allotropic form of carbon. There are at least three types of carbon nanotubes; multi-walled (MWCNT or MWCNTs), double walled (DWCNT or DWCNTs) and single walled carbon nanotubes (SWCNT or SWCNTs). SWCNTs have the most desirable physical properties. SWCNTs are among the strongest, most rigid and toughest materials known to man. They are more than 100 times stronger than steel but only $1/6^{th}$ of its weight, and can conduct electricity and heat better than any other substance. They have interesting aspect ratios (length/diameter), as well as exceptional absorbance capacity, and photo physical chemical behaviors. CNTs are highly sought additives for composites.

Composites usually consist of a fibre and a matrix. The fibre can be petroleum based or, more often in today's drive for sustainability and environmental soundness, the fibres may be derived from a biological source. The matrix is typically a polymer. As is the case with the fibre, biologically derived polymers (or biopolymers) are being seen as a desirable replacement for petroleum derived matrices.

Tai et al. (2008) investigated the reinforcement of phenolic resin with SWCNT. SWCNTs were made by chemical vapor deposition (CVD), and then formed a network of SWCNT bundles. The SWCNT film stripped from the network was mixed with commercial phenolic resin and then sonicated to embed phenolic resin into the SWCNT film. Solvent and moisture were then removed from the SWCNT film. The compounds were then cast in molds at 170° C. and 9.0 MPa for 2 hours to make composites. Post-curing was applied at 200° C. under vacuum for 12 hours. Young's modulus of SWCNTs/phenolic composites with 0.25, 0.50, 0.75, 1.0, 1.50 and 2.0 wt % SWCNTs was increased by 23.6%, 28.6%, 29.7%, 25.5%, 25.1% and 20.7%, respectively (based on pure phenolic resin), and improvement of tensile strength was 11.1%, 16.6%, 16.8%, 18.6 and 20.3%, respectively (based on the pure phenolic resin).

Yan et al. (2009) investigated the grafting of a chemical on the single-walled carbon nanotube (SWCNT) for phenolic resin composites. The SWCNTs were carboxylated in a strong inorganic acid condition with ultrasonication, and then synthesized aldehyde-functionalized SWCNT via two-step reactions, such as acyl chloride formation and its coupling to 2,2-dimethoxyethylamine. The resulting SWCNTs were dispersed in organic solvent and blended with phenolic resin in organic solvent. This mixture was ultrasonicated and then the solvent was removed and all materials (SWCNT and phenolic resin) were kneaded in a rheomixer at 50 rpm at an elevated temperature for 15 minutes. The resulting composite was cured at an elevated temperature for 7 hours under pressure. Yan et al. found increases of tensile strength and modulus for the SWCNT composite when compared with the control.

Mathur et al. (2010) studied the effects of carbon nanotube dispersion on the mechanical properties of phenolic resin composites. They adopted two methods to disperse carbon nanotubes. Firstly, the independently dispersed multi-walled carbon nanotubes and powder phenolic resin (Novolac) in acetone and sonicated for two hours. The two suspensions were then mixed and sonicated for another two hours, after which the mixture was poured into a petri dish and dried at 50° C. for 24 hours. Afterward, a composite was made using conventional hot pressing, and by curing at 180° C. for 2 hours in air. With dry mixing, a powder phenolic resin (Novolac) and MWCNTs were mixed thoroughly in a mixer by ball milling without solvent, and cast into a mold under the same conditions as the wet mixing procedure. Wet mixing showed little improvement in the mechanical properties of MWCNT/phenolic composites, while dry mixing produced an improvement of nearly 160% with 5% (vol.).

The mechanical and structural properties of carbon nanotubes hold potential for a large-scale application in some materials (Endo et al., *Potential Applications of Carbon Nanotubes*, Chapter 2 in Carbon Nanotubes (Eds. by A. Jorio, G. Dresselhaus, M. S. Dresselhaus, *Topics Appl.* Physics 111, 13-62, 2008)). Nanotubes are considered to be the ideal form of carbon fiber with superior mechanical properties compared to the best of traditional carbon fibers, where carbon fibers have a specific strength (strength/density) fifty times that of steel and are excellent load-bearing reinforcements in composites (Baughman et al., *Carbon nanotubes-the route towards applications*, Science, 2002, 297, 787-792). The tensile strength of individual nanotubes may approach several 100 GPa with an elastic modulus in the TPa range, thus nanotubes have mechanical properties exceeding those of traditional carbon fibers.

The nanotubes can sustain large strains under compression. Although nanotubes have a near perfect structure and a high aspect ratio, there are still challenges in adapting these materials for structural applications. There has not been significant progress in developing nanotube-based composites that outperform the best carbon-fiber composites (Endo et al. ibid 2008). Although nanotube-filled polymer composites could have the advantages, the main challenges are 1) creating a strong interface between nanotubes and the polymer matrix due to the atomic smoothness of nanotubes, and 2) dispersing the individual nanotubes in the polymer, not aggregating in multi-walled carbon nanotubes or bundles in single walled carbon nanotubes (nanotubes are easily re-organized into aggregates).

In recent years, attempts have been made to use carbon nanotubes as reinforcing agents for phenolic resins, specifically to act as a matrix. When carbon nanotube were incorporated into a phenolic resin matrix, there were several problems: 1) CNTs needed to be first dissolved or dispersed in an organic solvent; 2) commercial phenolic resins can be in the form of powder instead of liquid; 3) when incorporating CNTs in a phenolic resin, the organic solvent needs to be able to bring both together before it is removed, and the resulting mixture needs to be further mixed by kneading at an elevated temperature; and 4) the resulting CNTs/phenolic resins mixtures were used only as structural composites, but were not suitable to be used as wood adhesives.

Described herein is a method and a manufacturing process that overcomes these problems.

SUMMARY OF THE INVENTION

It is an object of this invention to provide a method of producing a phenol-formaldehyde polymer comprising carbon nanotubes (CNTs).

It is a further object of this invention to provide a phenol-formaldehyde polymer composition containing carbon nanotubes (CNTs).

It is a still further object of this invention to provide a method of producing a composite of phenol-formaldehyde polymer and carbon nanotubes (CNTs).

It is a yet further object of this invention to provide a composite of phenol-formaldehyde polymer and carbon nanotubes (CNTs).

In accordance with one aspect of the present invention there is provided a method of producing a phenol-formaldehyde polymer comprising carbon nanotubes (CNTs), the method comprising: providing the CNTs, dispersing the CNTs in an alkaline aqueous solution comprising at least one phenolic polymer to produce a CNT-phenolic polymer complex, providing a polymerization mixture comprising a phenolic compound, formaldehyde or a formaldehyde equivalent, a base and optionally at least one lignin, combining the CNT-phenolic polymer complex with the polymerization mixture to produce a polymerization medium, and raising the temperature of the medium above a phenol-formaldehyde polymerization temperature, wherein the medium is covalently bonded to produce the phenol-formaldehyde polymer.

In accordance with another aspect of the present invention, there is provided a phenol-formaldehyde polymer composition comprising: a phenolic polymer, a phenolic compound, formaldehyde or a formaldehyde equivalent, a hydroxide, carbon nanotubes (CNTs) and optionally at least one lignin.

In still another aspect of the invention there is provided a method of producing a composite of phenol-formaldehyde polymer and carbon nanotubes (CNTs), comprising: functionalising CNTs with phenolic moities, combining the functionalised CNTs with a phenolic compound, formaldehyde or a formaldehyde equivalent, a base and optionally at least one lignin to form a mixture, and polymerising the mixture at a phenol-formaldehyde polymerization temperature to produce a matrix of a phenol-formaldehyde polymer with the CNTs therein, wherein the CNTs is covalently linked to the polymer through said phenolic moities.

In yet another aspect of the invention there is provided a composite of phenol-formaldehyde polymer and carbon nanotubes (CNTs), wherein said CNTs bear phenolic moities which are polymerised in said phenol-formaldehyde polymer.

The phenolic moities may be provided from a source of phenolic moities as described herein, including phenol compounds such as p-aminophenol which have a functional group which covalently links to the CNTs and phenol functional polymers which have a supramolecular interaction with CNTs, as well as combinations of these.

BRIEF DESCRIPTION OF THE DRAWINGS

Further aspects and advantages will become better understood with reference to the description in association with the following drawings in which:

FIG. 1.1 illustrates a method of modifying carbon nanotubes by covalent bonding according to one embodiment described herein;

FIG. 1.2 illustrates a method of modifying carbon nanotubes by supramolecular chemistry according to another embodiment described herein;

FIG. 1.3 illustrates a method of modifying carbon nanotubes by combined covalent and supramolecular chemistry according to another embodiment described herein;

FIG. 2.1 illustrates a graph of adhesive viscosity (cps) versus reaction time according to preferred embodiments and controls described herein;

FIG. 2.2 illustrates a histogram of a pulled-closed (pretest) shear strength (kPa) of preferred embodiments and controls described herein;

FIG. 2.3 illustrates a histogram of a pulled-open (pretest) shear strength (kPa) of preferred embodiments and controls described herein;

FIG. 2.4 illustrates a histogram of a pulled-closed (pretest) shear strength (kPa) of preferred embodiments and controls described herein;

FIG. 2.5 illustrates a histogram of 24 hour swelling test (%) of preferred embodiments and controls described herein;

FIG. 2.6 illustrates a histogram of 24 hour water absorption test (% wt) of preferred embodiments and controls described herein;

FIG. 2.7 illustrates a histogram of internal bonding (IB) made with and without the single wall carbon nanotubes according to preferred embodiments described herein;

FIG. 2.8 illustrates a histogram of the modulus of elasticity of wood composites made with and without using adhesives according to preferred embodiments described herein; and FIG. 2.9 illustrates a histogram of the modulus of rupture of wood composites made with and without using adhesives according to preferred embodiments described herein.

DESCRIPTION OF THE INVENTION

Figure 3:
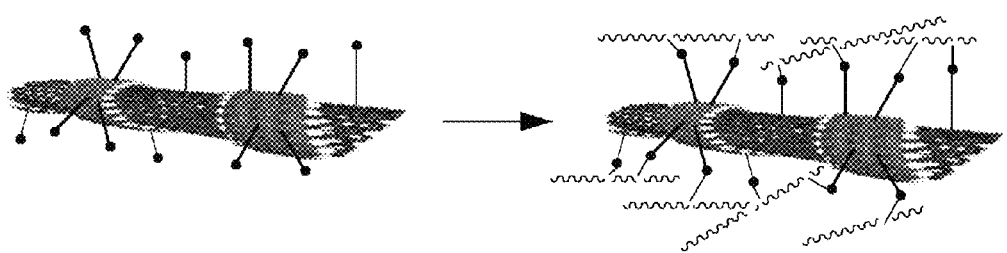

For ease of understanding, a number of terms used herein are described below in more details:

A "phenolic polymer" is any polymer that comprises phenolic groups. Phenolic polymers may comprise a poly(4-vinylphenol), a phenol-formaldehyde resin, a lignin or combinations thereof.

"Lignin" refers to a "phenolic polymer" or group thereof, that give strength and rigidity to plant materials. Lignins are complex polymers, and tend to be referred to in generic terms. Lignins include, industrial lignin preparations, such as Kraft lignin; lignosulfonates, and organosolv lignin that is a by-product of a cellulosic ethanol process for producing alcohol from cellulosic material, similar processes comprising but not limited to the production of bioethanol and/or biobutanol; and analytical lignin preparations, such as, dioxane acidolysis lignin, milled wood lignin, Klason lignin, cellulolytic enzyme lignin, as well as combinations thereof.

"Lignin component" represents any lignin-containing material. Lignin component can be derived from industrial lignin preparation and analytical lignin preparation that are renewable resources. Lignocelluloses are particularly preferred. The lignin component can be a material or compositions, which is modified or treated or purified portion of lignin.

"Lignocellulose materials" include all plant materials including: wood materials (such as wood strands, wood fibers or wood chips or wood particles), grass materials (such as hemp or flax), grain materials (such as the straw of rice, wheat, corn), and combinations thereof.

"Carbon nanotubes (CNT)" refer to allotropes of carbon with a cylindrical nanostructure. Nanotubes have been constructed with a length-to-diameter ratio of up to 28,000,000:1, which is significantly higher than any other material. Carbon nanotubes are categorized as: single-walled carbon nanotubes; and multi-walled carbon nanotubes. Single-walled carbon nanotubes use a single sheath of graphite one atom thick, called "graphene". Multi-walled carbon nanotubes are either wrapped into multiple layers like a parchment scroll or are constructed of multiple cylinders. There are several different methods of CNT synthesis (Seo et al., *Synthesis and manipulation of carbon nanotubes*, New Journal of Physics 5 (2003) 120.1-120.22), i.e. electric arc-discharge, laser ablation, catalytic vapor deposition (CVD) and RF plasma discharge. For the purpose of this invention SWCNT were prepared by the laser ablation process and the RF plasma discharge process.

"Carbon nanotube solutions" show strong van der Waal forces that make it very difficult to prepare and maintain a homogeneous dispersion of CNT in an aqueous or an organic solvent (Wang et al., *Effect of Surfactant Structure on the Stability of Carbon Nanotubes in Aqueous Solution*, J. Phys. Chem. B 2008, 112, 7227-7233). The technique known as Chemical functionalization is used to overcome this limitation. Atoms or molecules that naturally repel each other are attached to the walls of the CNT thereby making the CNT moieties repel or repulse each other. Chemical functionalization of the CNT can be by either covalent or non covalent methods. Covalent surface functionalization is chemically more challenging, it provides a chemical bond between the repulsive agent and the CNT but it can reduce the inherent electrical, mechanical, and optical properties of CNT. Non-covalent functionalization methods by surfactants can produce a dispersion as a result of the hydrophobic interaction between hydrophobic chains of surfactants and side walls of CNTs or π-π interaction of benzene rings on surfactants with CNT surfaces. Such interactions essentially lead to non covalent adsorption of surfactants onto CNTs, that provide net positive or negative charges on the tube surface and resulting in an enhanced solubility of the CNTs in aqueous solution (Wang et al. ibid 2008). A variety of biopolymers have also been used to effectively disperse SWCNT in aqueous solutions, such as oligonucleotides, peptides, chitosan, cellulose derivatives, and lignin (Haggenmueller et al., *Comparison of the Quality of Aqueous Dispersions of Single Wall Carbon Nanotubes Using Surfactants and Biomolecules*, Langmuir 2008, 24, 5070-5078).

"Carbon nanotubes (CNT) formulation" refers to the single walled carbon nanotube and multi-walled carbon nanotubes compounds in aqueous or non-aqueous solution.

A "phenolic compound" is one containing a phenol moiety. The phenolic compound is represented by Formula 1:

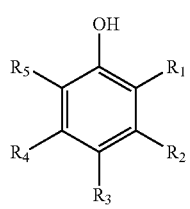

Formula 1 wherein $R_1$, $R_2$, $R_3$, $R_4$, and $R_5$ are each independently H; —OH; a halogen; a substituted or unsubstituted $C_1$-$C_3$ alkyl; a substituted or unsubstituted $C_1$-$C_3$ alkoxyl; a substituted or unsubstituted $C_2$-$C_3$ alkenyl; a substituted or unsubstituted phenyl, wherein the alkyl, the alkoxyl, the alkenyl, the phenyl are optionally substituted with at least one halogen, —OH, a $C_1$-$C_3$ alkyl, a $C_1$-$C_3$ alkoxyl, and $C_2$-$C_3$ alkenyl. In a preferred embodiment $R_1$, $R_3$ and $R_5$ are H. In a particular preferred embodiment the phenolic compound is phenol.

A "formaldehyde equivalent" refers to a compound supplying formaldehyde to the polymerization reaction. The formaldehyde equivalent or component is selected from a para-formaldehyde of Formula:

$HOCH_2(OCH_2)_nOCH_2OH$ in which n is an integer of 1 to 100, typically 6 to 100.

The method described herein produces intermediates, a first of which is a CNT-phenolic complex made by dispersing or dissolving CNTs with an alkaline solution and a phenolic polymer. The second intermediate is a polymerization mixture made with a phenolic compound, formaldehyde or a formaldehyde equivalent, a base and optionally a lignin, or with a material such as a polymer that is derived from at least some of these components, such as a phenol-formaldehyde resin. The third intermediate is a polymerization medium comprising the CNT-phenolic complex and the polymerization mixture.

The above definitions are provided for greater clarity and to give a more detailed description and must not be construed to limit the scope of the description.

The method described herein includes dispersing and/or dissolving of CNT in a basic solution with a lignin, this dispersion has been identified as a "CNT-lignin complex".

Further, the method described herein includes the mixing of a phenolic compound, formaldehyde or a formaldehyde equivalent, a base and optionally an additional amount of lignin. This mixture is named herein "polymerization mixture". The polymerization mixture and the CNT-lignin complex are combined to form a "polymerization medium". This medium is heated, and polymerizes to produce the phenol-formaldehyde polymer or resin, that may be used as an adhesive.

The method described herein includes 1) applying carbon nanotubes in aqueous solution, in which the carbon nanotubes are dissolved in water with assistance of phenolic polymers under an alkaline condition; 2) adopting in-situ polymerization technique to incorporate CNT into phenolic resin by which the resulting polymers have intimate contacts with carbon nanotubes and thus improve the interaction of CNTs with polymers; 3) creating the CNT-phenolic adhesive in an aqueous solution; 4) generating the CNT-phenolic powder adhesive; and 5) making the wood composites with CNT/phenolic adhesives.

One potential source for the biopolymer derived matrix is lignin, wood's natural adhesive. Lignin generally refers to a group of phenolic polymers that give strength and rigidity to plant materials. Lignins are complex polymers, and may include: industrial lignin preparations, such as Kraft lignin; lignosulfonates, and organosolv lignin (a by-product of cellulosic ethanol process), and analytical lignin preparations, such as dioxane acidolysis lignin, milled wood lignin, Klason lignin, cellulolytic and enzyme lignin, to name but a few.

Lignin is produced in large quantities in the pulp and paper industry and is usually used as a fuel in the pulping process thus contributing to the production of green house gases. More importantly for some types of pulp mills it is impossible to burn the lignin at the rate needed to maximize the throughput of the mill. As such, lignin is seen as a good candidate to replace the petroleum-based adhesives used in engineered wood products. Due to the inherently poorer mechanical performance to date of a bio derived matrices the need for additives is even more relevant for a biopolymer-based matrix to be used in engineered wood products.

Two such wood products are oriented strand board (OSB) and plywood. These engineered wood products are used extensively in the building and furniture industry. However, those skilled in the art will recognize that the basic principles to be described are applicable to any engineered wood product that consists of a wood fiber and an adhesive system.

The present description demonstrates a treatment of SWCNT under appropriate processing conditions that allow for the substitution of a petroleum-derived adhesive by a biopolymer-derived resin polymer to produce an engineered wood product that is superior in performance to the same wood product that was made from 100% petroleum-based adhesive.

Disclosed herein are: 1) Functionalization and solubilization of CNTs, particularly SWCNTs, with phenolic polymers, such as PF resins and lignins and 2) preparation of SWCNT-PF and SWCNT-PF-lignin resin/adhesive formulations: adhesives compositions and methods for making adhesive compositions, and methods for making ligno-cellulosic composites from renewable materials.

A first variant of a liquid form adhesive composition described herein: includes at least one carbon nanotube (CNT) solution, at least a phenol component, and at least a formaldehyde component. A second variant of a liquid form adhesive composition described herein: includes at least one carbon nanotube (CNT) solution, at least one lignin component, at least one phenol component, and at least one formaldehyde component. In a third variant of an adhesive composition, the composition is produced by mixing at least one lignin component, phenol, formaldehyde, CNT solution, reacting at elevated temperatures and a certain period of time to a certain viscosity at a required solid content, drying the resultant adhesive firstly diluted with CNT and then drying with spray dryer to obtain an adhesive in powder form.

Also disclosed herein are lignocellulosic composites that comprise the lignocellulosic materials and adhesive compositions, the methods for making adhesives, and the methods for making the composites.

1.0—Functionalization and Solubilization of SWCNTs with Phenolic Polymers for the Integration into LPF Adhesives at Molecular Lever As previously mentioned, CNTs tend to form large aggregates or bundles due to their intrinsic $sp^2$ hybrid aromatic structure and small diameters, which results in very strong intermolecular attractive forces. In addition to this bundling effect, the aromatic structure of CNTs makes them incompatible with practically all matrices, because there is little to no interfacial bonding between a CNT and matrix. Thus, untreated bulk CNT powder has not up to now been distributed homogenously in matrices. With little to no interfacial adhesion, CNT introduced in PF or other matrices has resulted in little to no reinforcement, but normally a decrease in mechanical properties.

To overcome the problem, CNTs must be dispersible in liquids. To achieve this, CNTs must be functionalized physically or chemically by attaching certain molecules, or functional groups, to their smooth sidewalls without significantly changing the desirable properties of nanotubes. The present invention provides the preparation of novel CNT-reinforced PF or lignin-PF (LPF) resins, whereby the CNTs are homogeneously placed within the resins, fabricated by a solution molecular-level integration process.

This process involves dispersing the provided CNTs, and preferably SWCNTs, in a basic (alkaline) aqueous solution including phenolic functional polymers, by surface covalent and/or supramolecular functionalization. The polymers are utilized to liberate the CNT bundles from one another and allow complete dissolution of the individual nanotubes on a molecular level. The phenolic functional polymers appear to assist in the integration of CNTs into the LPF resins through further cross-linking in the presence of formaldehyde during resins polymerization. Finally, the integration of CNTs into LPF resins is completed by in situ polymerization with lignin, phenol, and formaldehyde using phenolic polymer-CNTs as a stock solution.

Three methods are included herein for the description of the CNTs. These methods are: covalent chemistry; supramolecular chemistry, and a combination of covalent and supramolecular chemistry. As previously mentioned, the SWCNTs used in all experiments are derived from a laser ablation and RF plasma discharge.

Example 1.1

Covalent Chemistry Method

Phenol functionalized CNTs were prepared by the covalent reaction of p-aminophenol with SWCNTs in DMF using in situ diazotization and coupling procedure according to a published protocol, Bahr, J. L, Tour. J. M., Highly Functionalized Carbon Nanotubes Using in Situ Generated Dizonium Compounds. Chem. Mater. 2001, 13, pages 3823-2824. (FIG. 1.1).

FIG. 1.1 illustrates in covalent functionalization of a CNT with the inclusion of phenol moieties into the CNT structure, which moities act as a point of connection for the PF polymer during the polymerization reaction in two similar ways. FIG. 1.1 is meant to be illustrative and does not represent the mass ratios of the CNT and PF.

The Raman spectrum shows an increase in the disorder band (D-band) when compared to the spectrum of pristine nanotubes, indicating a covalent functionalization. In addition, the UV-vis adsorption spectrum showed the disappearance of all van Hove singularities when compared to unfunctionalized CNT starting materials, again indicating that covalent functionalization had occurred. The solubility of phenol functionalized SWCNTs is enhanced in DMF (dimethylformamide), and with an alkyl nitrite, shown in FIG. 1.1. However, this solution is not soluble in aqueous NaOH, the preferred medium for synthesis of phenolic resin synthesis. Therefore, covalent functionalization of CNTs alone is less suitable for phenol-formaldehyde and/or lignin-phenol-formaldehyde resin synthesis, but as will be shown below, this method may be adapted to be more suitable for PF-CNF polymerization.

Example 1.2

Supramolecular Chemistry Method

Supramolecular method involves physical adsorption of molecules capable of π-stacking or van der Waals interactions with the aromatic and hydrophobic nanotube sidewalls. Unlike covalent sidewall functionalization, the supramolecular strategy preserves the electronic and structural integrity of CNTs, permitting their use in applications requiring high conductivity and strength properties. This method is also simple, rapid, highly efficient, as well as cost effective. This method involves only sonicating the mixture of polymer(s) and CNTs in solvents.

FIG. 1.2 illustrates the supramolecular interactions of phenolic functional polymers, as well as the groups of three phenolic functional polymers that are applicable to the present polymerization. FIG. 1.2 is meant to be illustrative and does not represent the mass ratios of the CNT and PF in the polymer. Three types of phenolic functional polymers were found to form strong supramolecular interactions with CNTs. These polymers include: poly(4-vinylphenol) (PVP), phenol-formaldehyde resins (both thermoplastic novolak and thermoset resole resins), and lignins (both lignosulfonates and Kraft lignins). All of these phenolic functional polymers are compatible with LPF resins due to the active phenolic functionalities. Their structures are shown in FIG. 1.2. NaOH aqueous solution (0.05 M) is used as a solvent, primarily due to its compatibility as a medium for polymerizing LPF resins. In a typical experiment, a sample of CNTs (1.0 g) was added to a solution of phenolic polymers (2.0 g) in 0.05 M NaOH aqueous solution (2.0 L). The resulting suspension is sonicated for 30 min using a tip sonicator at room temperature. A homogeneous dark and stable solution is produced, leaving practically no visible insoluble nanotube residue. As an additional control experiment, when only the CNTs were suspended in the same solvents under the conditions outlined above, nanotube solubility was not observed to any extent.

The solution of CNT-phenolic polymer supramolecular complex or CNT-lignin complex remains stable upon standing for several months, which indicates that the polymer-nanotube interaction is quite strong. The structure of the phenolic polymers in alkaline water is likely responsible for the binding strength. The hydrophobic polymer backbone would likely wrap around the CNTs, and hydrophilic phenoxide moiety provides the water solubility. These supramolecular interactions liberate the CNT bundles, allow complete dissolution of the individual CNTs, and yield an excellent dispersion. The stability of these solutions is likely a result of two factors: the aqueous solubility imparted by the phenolic functionalities as well as the prevention of aggregation due to the intermolecular electrostatic repulsion by these functional groups/complexes.

Example 1.3

Combination of Covalent and Supramolecular Chemistry Method

The advantage of covalent chemistry is that the covalent grafting of phenol functionalities can provide direct interfacial chemical bonding between CNTs and PF resin matrix, while the disadvantage is that the phenol functionalized CNTs have very poor solubility in NaOH aqueous solution, which limit their integration into LPF resins at the molecular level. By contrast, the high solubility of phenolic polymer-CNT complexes, due to the supramolecular chemistry, allow for an excellent integration of CNTs into LPF resins at the molecular level, and the phenolic functionalities on the CNTs surface help the cross-linking of the whole LPF system. However, the CNTs are still relatively loose in the LPF matrix because there is no direct interfacial chemical bonding between the CNTs and the matrix. Therefore the third method, which is a combination of covalent and supramolecular chemistry, was developed. In this method, CNTs were firstly covalently functionalized with phenol groups as described in Example 1.1. They are then dissolved with the addition of phenolic functional polymers such as PF resins and lignins by sonication in aqueous NaOH solution as described in Example 1.2. Therefore, not only can the phenolic functional polymers be homogeneously distributed into LPF resins at the molecular level, but they can also form a direct chemical bonding with the LPF resins matrix, which results in a further improvement of the mechanical performance of wood composites. FIG. 1.3 illustrates the combined covalent/supramolecular interactions of phenolic functional polymers, for lignin-phenol-formaldehyde resin applications for the present polymerization. FIG. 1.3 is also meant to be illustrative and does not represent the mass ratios of the CNT and LPF in the polymer composition.

Those skilled in the art will recognize that the covalent-supramolecular combination method offers the greatest potential because the CNT will not only be dispersed at molecular level, but will also be covalently bonded to the PF or LPF resins as shown in FIG. 1.3. However, since the supramolecular pathway is the most cost effective approach of the three methods described herein, three samples (Table 1.1) of SWCNT-lignin/PF solutions were prepared to demonstrate the effectiveness of this method of integrating SWCNT into PF or LPF resins/adhesives.

TABLE 1.1

| | Different SWCNT solutions | | |
|---|---|---|---|
| Solution | SWCNT1 | SWCNT2 | SWCNT3 |
| Media SWCNT | water | water | Water |
| method | Laser produced SWCNT | Plasma produced SWCNT | Laser produced SWCNT |
| g/L Polymer | 0.5 | 0.5 | 0.5 |
| type | Kraft lignin | Kraft lignin | Resole-PF |
| g/L | 1 | 1 | 1 |
| Other chemical | Sodium hydroxide | Sodium hydroxide | Sodium hydroxide |
| g/L | 2 | 2 | 2 |

Example 2.0

Preparation of the SWCNT-Phenol-Formaldehyde and SWCNT-Lignin-Phenol-Formaldehyde Resin/Adhesive Formulations Phenol-formaldehyde (PF) resins are known to be prepared from two main chemicals that are reacted at elevated temperatures through methylolation and condensation reaction and form a phenol-formaldehyde polymer. The polymer formation is strongly influenced by the molar ratio of phenol to formaldehyde, and the pH at which the reaction is carried out. The phenolic resin is in a preferred embodiment a Novolac resin, having a molar ratio of formaldehyde to phenol that is less than 1 and at low pH. The phenolic resin is a Resol type resin, when the molar ratio of formaldehyde to phenol is higher than 1, and the pH is higher than 7. Resol type phenolic resins will crosslink, usually at elevated temperatures.

The method described herein, is meant to incorporate carbon nanotube in phenol-formaldehyde adhesives or lignin-phenol-formaldehyde adhesive and thus improve the bonding properties of wood composites and mechanical properties of wood composites.

More specifically, the method described herein: 1) incorporates CNT, preferably SWCNT, into phenolic resin through in-situ polymerization, and 2) provides a process for preparing thermoset adhesives wherein a lignin is used to copolymerize with phenol and formaldehyde.

The amount of lignin used may be up to 50% by weight of phenol in the formulation. In a preferred embodiment, the range is 30% or higher by weight of phenol in the formulations. The resulting adhesives have been found to meet CSA and ASTM standard requirements for bond strength in oriented strand board (OSB) and plywood.

The use of lignin reduces the amount of phenol and formaldehyde solids required to form the LPF polymer. Lignin reacts with formaldehyde in a methylolation reaction and then forms a copolymer in a condensation reaction. The product obtained is a lignin-phenol-formaldehyde copolymer adhesive. Below the general chemistry associated with forming the final adhesive mixtures is described.

The first step of the method described herein is the mixing of lignin with phenol, formaldehyde, a hydroxide and the prepared carbon nanotube solution (i.e. of Examples 1.1, 1.2 and 1.3) and allowing the mixture to react at elevated temperatures. The order of addition of the above starting compounds may vary. In a preferred embodiment, phenol is added to the carbon nanotube solution first. Then lignin is added, followed by formaldehyde, usually in the form of para-formaldehyde. The temperature is raised to 50-60° C., and then the hydroxide, in a preferred embodiment sodium and/or potassium hydroxide is added. The form of the hydroxide solution is usually 50% by weight of sodium hydroxide. This prepared medium is heated to temperatures ranging between 60-75° C., preferably ~70° C., for a period of 1 to 2 hours. At this time, the methylolation reaction takes place, with formaldehyde reacting at the ortho-position of the phenol and with available sites on the lignin.

The second step of the present method is the loading of more sodium hydroxide in the form of a solution containing 50% by weight of sodium hydroxide, along with more carbon nanotube solution. The temperature of the medium is maintained at levels prescribed in the first step. The reaction time is generally between 10 minutes and 1 hour. In the second step, the methylolation reaction continues.

Such two-stage processing is preferred, but the same method can be conducted in a single step, and may produce a similar LPF polymer. The LPF polymer obtained in a single step process may have different properties to the LPF polymer produced in two steps.

The method further includes a third step, where the temperature is raised to 75-95° C. for a condensation reaction of the methylolated lignin with methylolated phenol, and preferably 80-85° C. for a certain period of time. At this stage, temperature control is important to obtain proper viscosity range. The viscosity is typically varied for different applications, in the range approximately 100-200 cps for OSB with solid content around 45-50%, approximately 250-3000 cps or over for plywood making, and approximately 60-200 cps for powder resin applications.

The quantities of raw materials added at each step, the temperature at which the reactions occur and/or the molar ratios of formaldehyde to phenol, may all vary depending on the final LPF polymers requirements. In practice, the molar ratio of formaldehyde to phenol is preferably from 1.8:1 to 3.0:1. More preferably, the molar ratio varies from 2.2:1 to 2.8:1; the weight ratio of base (sodium hydroxide and/or potassium hydroxide) to phenol and (lignin if applicable) varies from 0.03:1.00 to 0.30:1.00. More preferably, the weight ratio varies from 0.08:1.00 to 0.15:1.00.

The following examples describe the general chemistry of several preferred embodiments.

EXAMPLES

Example 2.1

Preparation of SWCNT-Phenol-Formaldehyde Adhesive

A SWCNT solution is formulated with phenol (98 wt %) 220 parts by weight; paraformaldehyde (91 wt %) 190 parts by weight; sodium hydroxide (50 wt %) 38 parts, single-walled carbon nanotube solution (SWCNT3) 455 parts.

A 1-liter reaction vessel is loaded with phenol, paraformaldehyde, some of the sodium hydroxide (22 parts), and part of SWCNT solution (370 parts) to make the solid content around 50 wt % of the phenol. The mixture is heated to approximately 70° C. for one and half hours, and the remaining sodium hydroxide and SWCNT solution are added. The temperature is maintained around 70° C. for another half hour. Afterward, the temperature is increased to 80-90° C. and the viscosity is monitored to 150-200 cps. For practical purposes, it is easier to control the synthesis of phenolic resin by lowering the temperature to 70-75° C., while the viscosity is 80-100 cps, and then monitor the viscosity to the required level. The reaction is terminated by cooling the system with cooling water to around 30° C. The resulting products are transferred to a container and stored in a cold room (4° C.) before further use. The adhesive is identified by SWCNT3PF. The SWCNT content is 0.056 wt % based on solid content of polymer adhesive, and 0.025 wt % based on total weight of the adhesive in liquid form. The viscosity as a function of reaction time is illustrated in FIG. 2.1.

The properties of the so prepared polymers are given in Table 2.1 as follows:

TABLE 2.1

Phenolic resin made with/without SWCNT

| Example No. | Code | Non-volatile Content* (%) | Specific Gravity** (g/mL) | Viscosity (centipoise) | Gel Time*** (second) |
|---|---|---|---|---|---|
| 1 | SWCNT3PF | 38.90 ± 0.02 | 1.16 | 165 | 473 ± 1 |
| 2 | SWCNT1LPF | 41.08 ± 0.07 | 1.15 | 185 | 525 ± 5 |
| 3 | SWCNT2LPF | 41.21 ± 0.05 | 1.16 | 165 | 559 ± 11 |
| 4 | PF control | 38.14 ± 0.02 | 1.16 | 145 | 452 ± 1 |
| 5 | LPF control | 40.69 ± 0.08 | 1.15 | 162 | 535 ± 25 |

*1 g/105° C./24 hrs;
**mass at constant volume of 8.32 mL at 25° C.,
***5 g/120° C.

SWCNT3PF: SWCNT-phenol-formaldehyde adhesive (SWCNTs in Table 1.1) from EXAMPLE 2.1
SWCNT1LPF: SWCNT-lignin-phenol-formaldehyde adhesive (SWCNT2 in Table 1.1) from EXAMPLE 2.2
SWCNT2LPF: SWCNT-lignin-phenol-formaldehyde adhesive (SWCNT1 in Table 1.1) from EXAMPLE 2.3

Yellow birch veneer strips (1.5 mm thick×120 mm wide× 240 mm long) were cut from fresh yellow birch logs with the long direction being parallel to the wood grains. The polymers prepared above were applied to one side of each face layer (the manufacturing condition for plywood making is given in Table 2.2). After manufacturing, the panels were conditioned at 21° C. and 20% relative humidity until consistent moisture content was reached. These three-ply plywood samples were then cut into testing specimen size (25 mm wide×80 mm long) for a plywood shear test. The two specimens (one pulled open and one pulled closed) were cut from each plywood panel, making at least eight specimens [where at least four specimens were pulled open and four specimens were pulled closed] were tested wet after 48-hour soaking. The results are given in FIG. 2.2 and FIG. 2.3. The shear strength of plywood, made with SWCNT3PF, increased by 8.4% for the pull-close mode, and 13.3% for the pull-open mode. All other plywood panels were cut in pulled-closed, and tested wet after 48 hours of soaking in water at room temperature, and the all pulled closed results are given in FIG. 2.4.

The abbreviations used in FIG. 2.1, FIG. 2.2, FIG. 2.3, and FIG. 2.4 are: PF: phenol-formaldehyde resin from EXAMPLE 2.4; LPF: lignin-phenol-formaldehyde resin from EXAMPLE 2.5; SWCNT1LPF: SWCNT-lignin-phenol-formaldehyde adhesive (SWCNT solution made by the laser method) from EXAMPLE 2.2; SWCNT2LPF: SWCNT-lignin-phenol-formaldehyde adhesive (SWCNT solution made by the plasma method) from EXAMPLE 2.3 and SWCNT3PF: SWCNT-phenol-formaldehyde adhesive (SWCNT solution made by the laser method) from EXAMPLE 2.1.

The average value of shear strength of 32 specimens was 2925±244 kPa, which is higher or equivalent to specimens made with control PF resin (2897±244 kPa).

TABLE 2.2

| Plywood manufacturing conditions | |
| --- | --- |
| Wood species | Yellow birch |
| Thickness of veneer | 1.5 mm |
| plywood | 3-ply plywood |
| Resin spread rate on face ply | 170 g/m² |
| Open assembly time | 2-20 minutes |
| Close assembly time | 2-10 minutes |
| Temperature | 150° C. |
| Pressure | 1500 kPa |
| Time | 7 min |
| Release pressure | 30 sec. |

The shear strength of plywood is listed in Table 2.3.

TABLE 2.3

Plywood shear properties of phenolic resins with/without SWCNT

| Example No. | Code | Pre-Test* (Pulled-closed) | Pre-test* (Pulled-open) | Test** (Pulled closed) | Wood Failure (%) (pulled closed)** |
| --- | --- | --- | --- | --- | --- |
| 1 | SWCNT3PF | 3063 ± 349 | 2190 ± 121 | 2926 ± 244 | 84 ± 24 |
| 2 | SWCNT1LPF | 3122 ± 232 | 1913 ± 181 | 2911 ± 219 | 94 ± 16 |
| 3 | SWCNT2LPF | 2791 ± 147 | 1868 ± 111 | 2697 ± 226 | 81 ± 32 |
| 4 | PF control | 2825 ± 197 | 1933 ± 200 | 2897 ± 244 | 69 ± 40 |
| 5 | LPF control | 2614 ± 128 | 1811 ± 188 | 2572 ± 223 | 83 ± 27 |

*one pulled closed and one pulled open specimens were cut from each plywood panel and tested after 48 soaking in running water at 20° C. (4 pulled closed and 4 pulled open specimens);
**after pre-test, all panels were cut in pulled-closed pattern and tested after 48 hrs in water and wet (at least 32 specimens for each formulation).

SWCNT3PF: SWCNT-phenol-formaldehyde adhesive (SWCNTs in Table 1.1) from EXAMPLE 2.1
SWCNT2LPF: SWCNT-lignin-phenol-formaldehyde adhesive (SWCNT2 in Table 1.1) from EXAMPLE 2.3
SWCNT1LPF: SWCNT-lignin-phenol-formaldehyde adhesive (SWCNT1 in Table 1.1) from EXAMPLE 2.2

A comparison of plywood shear strength between the control panel and panels made with SWCNT-phenolic resin is found in Table 2.4.

TABLE 2.4

Comparison of SWCNT-phenolic resin with control for plywood shear strength

| | | Improvement (%)* | | | |
| --- | --- | --- | --- | --- | --- |
| Example No. | Code | Pre-Test** (Pulled-closed) | Pre-test** (Pulled-open) | Test*** (Pulled-closed) | Remarks |
| 1 | SWCNT3PF | 8.42 | 13.30 | 1.00 | Comparing with PF control (Ex. 4) |
| 2 | SWCNT1LPF | 19.43 | 5.63 | 13.18 | Comparing with LPF control (Ex. 5) |
| 3 | SWCNT2LPF | 6.77 | 3.15 | 4.86 | Comparing with LPF control (Ex. 5) |

*= (value − control)/control × 100%
**one pulled closed and one pulled open specimens were cut from each plywood panel and tested after 48 soaking in running water at 20° C. (4 pulled closed and 4 pulled open specimens);
***after pre-test, all panels were cut in pulled-closed pattern and tested after 48 hrs in water and wet (at least 32 specimens for each formulation).

The properties of OSB panels made with lignin-phenol-formaldehyde adhesives on face strands and a 100% commercial phenolic resin on core strands, under the pressing conditions are given in Table 2.5.

TABLE 2.5

OSB making conditions with phenolic resin

| | |
|---|---|
| Target panel density (OD basis) | 40 lbs/ft$^3$ |
| Mat dimensions | 20 in × 23 in |
| Target panel thickness | 11.1 mm (7/16 in) |
| Mat composition: face/ core /face | 25/50/25 |
| Resin dosage Face: | 3% |
| Core: | 3% |
| Wax dosage | |
| Face: | 1% |
| Core: | 1% |
| Face wafer moisture before resin and wax | ~2% |
| Core wafer moisture before resin and wax | ~2.5% |
| Core moisture after resin and wax | ~3.5% |
| Face moisture after resin and wax | 7-8% |
| Press temperature (° C.) | 220° C. |

The mechanical properties of OSB panels, including thickness swelling (TS), water absorption (WA), internal bond (IB) strength, modulus of elasticity (MOE) and modulus of rupture (MOR), are illustrated in FIGS. 2.5, 2.6, 2.7, 2.8, and 2.9, respectively, and all results are summarized in Table 2.6 and 2.7. The numerals used at the base of each bar (and here below italicized) in FIG. 2.5, FIG. 2.6, FIG. 2.7, FIG. 2.8, and FIG. 2.9 represent: 1: OSB made with SWCNT3PF from EXAMPLE 2.1, 2: OSB made with SWCNT1LPF from EXAMPLE 2.2; 3: OSB made with SWCNT2LPF from EXAMPLE 2.3; 4: OSB made with PF from EXAMPLE 2.4; 5: OSB made with LPF from EXAMPLE 2.5; 6: OSB made with PSWCNT1LPF1 from EXAMPLE 2.6; 7: OSB made with PSWCNT1LPF2 from EXAMPLE 2.7; CPF: OSB made with commercial PF resin. OSB refers to Oriented Strand Broad.

For the panel made with SWCNT3PF, the TS and WA were reduced by 16% and 15%, respectively, the IB increased by about 24% and MOR increased by around 13%, as compared with the control PF resin. The MOE was comparable with the control.

TABLE 2.6

Mechanical properties of OSB panels made with phenolic resins

| Example No. | Code | 24-h TS (%) | 24-h WA (%) | IB (MPa) | MOE (MPa) | MOR (MPa) |
|---|---|---|---|---|---|---|
| 1 | SWCNT3PF | 18.12 ± 0.71 | 28.91 ± 1.27 | 0.51 ± 0.07 | 3931 ± 481 | 35.99 ± 6.25 |
| 2 | SWCNT1LPF | 23.93 ± 2.30 | 40.77 ± 2.59 | 0.45 ± 0.08 | 3707 ± 298 | 30.90 ± 6.53 |
| 3 | SWCNT2LPF | 20.55 ± 1.89 | 35.76 ± 1.99 | 0.53 ± 0.08 | 3819 ± 303 | 35.80 ± 3.36 |
| 4 | PF (control) | 21.47 ± 0.53 | 33.97 ± 1.73 | 0.41 ± 0.09 | 4006 ± 285 | 31.90 ± 9.19 |
| 5 | LPF (control) | 31.68 ± 2.09 | 52.67 ± 2.08 | 0.44 ± 0.08 | 3647 ± 339 | 26.95 ± 4.20 |
| 6 | Commercial PPF | 25.64 ± 0.86 | 45.17 ± 4.33 | 0.42 ± 0.08 | 3535 ± 419 | 27.44 ± 4.66 |
| 7 | PSWCNT1LPF1 | 19.02 ± 1.38 | 30.55 ± 0.45 | 0.53 ± 0.08 | 3827 ± 563 | 35.09 ± 6.35 |
| 8 | PSWCNT1LPF2 | 16.64 ± 0.74 | 28.40 ± 1.05 | 0.51 ± 0.07 | 3536 ± 412 | 29.92 ± 5.25 |

SWCNT3PF: SWCNT-phenol-formaldehyde adhesive (SWCNTs in Table 1.1) from EXAMPLE 2.1
SWCNT2LPF: SWCNT-lignin-phenol-formaldehyde adhesive (SWCNT2 in Table 1.1) from EXAMPLE 2.3
SWCNT1LPF: SWCNT-lignin-phenol-formaldehyde adhesive (SWCNT1 in Table 1.1) from EXAMPLE 2.2
PSWCNT1LPF1: spray drying (EXAMPLE 2.6) from SWCNT1LPF (from EXAMPLE 2.2)
PSWCNT1LPF2: spray drying (EXAMPLE 2.7) from SWCNT1LPF (from EXAMPLE 2.2) plus SWCNT2

TABLE 2.7

Comparisons of mechanical properties of OSB panels made with SWCNT-phenolic resins to control

| Example No. | Code | Improvement (%)* | | | | | Remarks |
|---|---|---|---|---|---|---|---|
| | | TS | WA | IB | MOE | MOR | |
| 1 | SWCNT3PF | 15.60 | 14.90 | 24.39 | -1.87 | 12.82 | With PF control (Ex. 4) |
| 2 | SWCNT1LPF | 24.46 | 22.59 | 2.27 | 1.65 | 14.66 | With LPF control (Ex. 5) |
| 3 | SWCNT2LPF | 35.13 | 32.11 | 20.45 | 4.72 | 32.84 | With LPF control (Ex. 5) |
| 6 | PSWCNT1LPF1 | 39.96 | 42.00 | 20.45 | 4.94 | 30.20 | With LPF control (Ex. 5) |
| 7 | PSWCNT1LPF2 | 47.47 | 46.08 | 15.91 | -3.04 | 11.02 | With LPF control (Ex. 5) |

*TS or WA = (control – value)/control × 100%; IB, MOE, or MOR = (value – control)/control × 100%

SWCNT3PF: SWCNT-phenol-formaldehyde adhesive (SWCNTs in Table 1.1) from EXAMPLE 2.1

SWCNT2LPF: SWCNT-lignin-phenol-formaldehyde adhesive (SWCNT2 in Table 1.1) from EXAMPLE 2.3

SWCNT1LPF: SWCNT-lignin-phenol-formaldehyde adhesive (SWCNT1 in Table 1.1) from EXAMPLE 2.2

PSWCNT1LPF1: spray drying (EXAMPLE 2.6) from SWCNT1LPF (from EXAMPLE 2.2)

PSWCNT1LPF2: spray drying (EXAMPLE 2.7) from SWCNT1LPF (from EXAMPLE 2.2) plus SWCNT2

Example 2.2

Preparation of SWCNT-Lignin-Phenol-Formaldehyde Adhesive

A SWCNT solution mixture was formulated from Phenol (98%) 172 parts by weight, Indulin AT lignin 90 parts by weight, paraformaldehyde (91%) 148 parts by weight, sodium hydroxide (50 wt %) 45 parts, single-walled carbon nanotube solution (SWCNT1) 455 parts.

To a 1-L reaction vessel, phenol, Indulin AT lignin, paraformaldehyde, part of sodium hydroxide (23 parts), and part of SWCNT solution (370 parts) are loaded to make a mixture with a solid content around 50%. The system is heated to around 70° C. for one and half hours, and the remaining sodium hydroxide and SWCNT1 solution are added. The temperature is maintained around 70° C. for another half hour. The temperature is then increased to 80-90° C. and monitored for a viscosity range to 150-200 cps. The reaction is stopped by cooling of the reactor to around 30° C., and transferring the resulting products to a container and stored in a cold room before usage. The adhesive is identified by SWCNT1LPF, where the SWCNT content is 0.055 wt % based on solid content of adhesive, and 0.025 wt % based on the total weight of the adhesive in liquid form. The viscosity as a function of reaction time is illustrated in FIG. 2.1.

The 3-ply plywood panels were made with SWCNT1LPF according to the procedure described in EXAMPLE 2.1. The average values of four specimens cut in pulled-closed and pulled-open modes are also depicted in FIGS. 2.2 and 2.3, respectively. The shear strength of plywood, made with SWCNT1LPF, increased by 19.4% for pull-close, and 5.6% for pull-open. All other plywood panel were cut in pulled-closed, and tested wet after 48 hours of soaking in water at room temperature, and the results are illustrated in FIG. 2.4. The average value of shear strength of 33 specimens was 2911±219 kPa, which was higher or equivalent to those of the specimens made with control PF resin (2897±244 kPa) of 33 specimens, and was higher than those of the specimens made with control LPF resin (2572±223 kPa) of 40 specimens by 13%.

The OSB panels were made with SWCNT1LPF with the same condition as described in EXAMPLE 2.1. The mechanical properties of OSB panels, including IB, TS, WA, MOE and MOR, are depicted in FIGS. 2.5, 2.6, 2.7, 2.8, and 2.9, respectively. The abbreviations are defined as: IB: internal bonding strength, TS: thickness swelling after 24 hrs soaking, WA: water absorption after 24 hrs soaking, MOE: modulus of elasticity measured by three-point-bending, MOR: bending strength (modulus of rupture) measured by three-point-bending). The TS was reduced by 24% comparing with control LPF resin, and water absorption was also reduced by 23% by weight. IB was comparable with control LPF adhesive. MOE was comparable with control LPF resin, and MOR increased by about 15%.

Example 2.3

Preparation of SWCNT-Lignin-Phenol-Formaldehyde Adhesive

This Example is similar to EXAMPLE 2.2, where the SWCNT1 solution is replaced with SWCNT2. All other procedures and parameters remained the same as in EXAMPLE 2.2. The adhesive is identified by SWCNT2LPF, in which SWCNT content was 0.055 wt % based on solid content of adhesive, and 0.025 wt % based on the total weight of the adhesive in liquid form. The viscosity as a function of reaction time is also depicted in FIG. 2.1.

The 3-ply plywood panels were made with SWCNT2LPF using conditions described in EXAMPLE 2.1. The average values of four specimens cut in pull-close and pull-open are also depicted in FIGS. 2.2 and 2.3, respectively. The shear strength of plywood, made with SWCNT2LPF, increased by 6.8% for pull-close, and 3.1% for pull-open. All other samples were cut in pull-close, and tested wet after 48 hours of soaking in water at room temperature, and the results are illustrated in FIG. 2.4. The average value of shear strength of 33 specimens was 2697±226 kPa. Even though this value is lower than the average of samples made with control PF resin (2897±244 kPa) of 33 samples, the value is higher than the average value of samples made with control LPF resin (2572±223 kPa) of 40 samples by 4.9%.

The OSB panels were made with SWCNT1LPF with the same condition as described in EXAMPLE 2.1. The mechanical properties of OSB panels, including IB, TS, WA, MOE and MOR, as previously defined are illustrated in FIGS. 2.5, 2.6, 2.7, 2.8, and 2.9, respectively. The TS was reduced by 35% comparing with control LPF resin, and water absorption was reduced by 32% by weight. IB increased by about 22% comparing with control LPF adhesive. MOE increased by around 5%, and MOR increased by around 32.8% comparing with control LPF resin.

Example 2.4

Preparation of Phenol-Formaldehyde Adhesive as a Control

A formulation consisting of Phenol (98%) 220 parts by weight, paraformaldehyde (91%) 190 parts by weight, sodium hydroxide (50 wt %) 40 parts, water 455 parts.

In a 1-L reaction vessel, phenol, paraformaldehyde, some of the sodium hydroxide (20 parts), and some of the water (370 parts) are loaded to make a medium having a solid content around 50 wt %. The system is heated to approximately 70° C. and the temperature is maintained for one and half hours. The remaining sodium hydroxide and water are added, and temperature is maintained at approximately 70° C. for another half hour. Subsequently, the temperature is increased to 80-90° C. The viscosity is monitored between 150-200 cps. The reaction is stopped by cooling the reactor to approximately 30° C. The contents are transferred to a container and stored in a cold room for later use. The adhesive is identified as PF. The viscosity as a function of reaction time is illustrated in FIG. 2.1.

The 3-ply plywood panels were made with the PF at the condition used in EXAMPLE 2.1. The average values of four specimens cut in pulled-closed and pulled-open are also illustrated in FIGS. 2.2 and 2.3, respectively.

The OSB panels made with SWCNT1LPF using the same procedures as described in EXAMPLE 2.1. The mechanical properties of OSB panels, including IB, TS, WA, MOE and MOR, are illustrated FIGS. 2.5, 2.6, 2.7, 2.8, and 2.9, respectively.

Example 2.5

Preparation of Lignin-Phenol-Formaldehyde Adhesive as a Control

A formulation of Phenol (98%) 172 parts by weight, Indulin AT lignin 90 parts by weight, paraformaldehyde (91%) 148 parts by weight, sodium hydroxide (50 wt %) 45 parts, water 455 parts.

In a 1-L reaction vessel, phenol, Indulin AT lignin, paraformaldehyde, some of the sodium hydroxide (23 parts), and some of the water (370 parts) are loaded to make a medium having a solids content around 50 wt %. The system is heated to approximately 70° C. for one and half hours. The remaining sodium hydroxide water are added, with the temperature maintained at approximately 70° C. for another half hour. Afterward, the temperature is increased to 80-90° C., and the viscosity is maintained between 150-200 cps. The reaction is stopped by cooling the reactor to approximately 30° C. The contents are transferred to a container and stored in a cold room for later use. The adhesive is identified as LPF. The viscosity as a function of reaction time is illustrated in FIG. 2.1.

The 3-ply plywood panels were made with the LPF using the conditions described in EXAMPLE 2.1. The average values of four specimens cut in pulled-closed and pulled-open are illustrated in FIGS. 2.2 and 2.3, respectively.

The OSB panels were made using SWCNT1LPF with the same procedure as described in EXAMPLE 2.1. The mechanical properties of OSB panels, including IB, TS, WA, MOE and MOR, are illustrated in FIGS. 2.5, 2.6, 2.7, 2.8, and 2.9, respectively.

Example 2.6

Preparation of SWCNTs-Lignin-Phenol-Formaldehyde Adhesive in Powder Form 1200 grams of SWCNT1LPF (from EXAMPLE 2.2) were diluted with 490 grams of water to 32 wt %. and dried in a pulverization spray dryer (Model: BE-1037, Series: Bowen) from Incotech Inc. (Bennières, Quebec, Canada). The dryer had a feed rate of 48 gram per minute, and the outlet temperature set at 88-91° C. At this feed rate, 446 grams of the powder resin were obtained (yield rate was 82.6%), having a moisture content in the powdered polymer about 3.1% wt. The polymer was identified by PSWCNT1LPF1, where the SWCNT content was 0.055 wt % based on the solid content in the resulting adhesive.

OSB panels were produced with PSWCNT1LPF1 using the procedure described in EXAMPLE 2.1. The mechanical properties of OSB panels, including TS, WA, IB, MOE and MOR, are illustrated in FIGS. 2.5, 2.6, 2.7, 2.8, and 2.9, respectively. The TS was reduced by 20% and water absorption was reduced by 25% by weight compared with the OSB made with SWCNT1LPF in liquid form. The TS was reduced by around 40%, and water absorption was reduced by around 34% compared with the control LPF liquid resin. IB increased by 19% compared with OSB made with SWCNT1LPF in liquid form and by 22% compared with OSB made with control LPF resin in liquid form. MOE increased by about 4.9% compared with the control LPF liquid resin, and MOR increased by about 30% compared with control LPF liquid resin.

Example 2.7

Preparation of SWCNTs-Lignin-Phenol-Formaldehyde Adhesive in Powder Form 1200 grams of SWCNT1LPF (from EXAMPLE 2.2) were diluted with 490 grams of SWCNT2 solution to 32 wt %, and dried in a pulverization spray dryer (Model: BE-1037, Series: Bowen) from Incotech Inc. (Bennières, Quebec, Canada). The dryer used a feed rate of 48 gram per minute, and the outlet temperature set at 88-91° C., and 435 grams of the powder resin were obtained (yield rate is 80%), having a moisture content in the powder polymer of about 3.8 wt %. The polymer was identified by PSWCNT1LPF2, where the SWCNT content was 0.10 wt % based on solids content of the resulting polymer.

OSB panels were produced with the PSWCNT1LPF2 using similar conditions as described in EXAMPLE 2.1. The mechanical properties of OSB panels, including TS, WA, IB, MOE and MOR, are illustrated in FIGS. 2.5, 2.6, 2.7, 2.8, and 2.9, respectively. By increasing the loading level of SWCNT in this polymer system, the TS and the WA were reduced. The TS was reduced by 12.5% compared with OSB made with PSWCNT1LPF1 in powder form, while the water absorption was also further reduced by 7% by weight comparing with OSB made with PSWCNT1LPF1 in powder form. The TS was reduced by around 47% compared with control LPF liquid resin, while the WA was reduced by around 64% compared with the control LPF liquid polymer. The IB increased by 16% compared with OSB made with the control LPF resin in liquid form. With regard to the bending properties, MOE was comparable with the control LPF liquid polymer, while the MOR increased by about 11% compared with the control LPF liquid resin.

In summary; the present invention describes a novel functionalization chemical pathway designed to be compatible with traditional chemistry associated with the phenolic resin chemistry used in wood composite production. This combination produces a new method to formulate a SWCNT-phenol-formaldehyde adhesive or SWCNT-phenol-lignin-formaldehyde adhesive suitable for the manufacture of wood composite products.

REFERENCES

Answers, Carbon nanotube, http://www.answers.com/topic/carbon-nanotube (2009)

Bahr, J. L, Tour. J. M., Highly Functionalized Carbon Nanotubes Using in Situ Generated Dizonium Compounds. Chem. Mater. 2001, 13, pg 3823-2824.

Baughman R. H., A. A. Zakhidov, W. A. Zakhidov, Carbon nanotubes—the route towards applications, Science, 2002, 297, 787-792

Endo M, M. S. Strano, P M Ajayan, Potential Applications of Carbon Nanotubes, Chapter 2 in Carbon Nanotubes (Eds. by A. Jorio, G. Dresselhaus, M. S. Dresselhaus, Topics Appl. Physics 111, 13-62, 2008)

Haggenmueller R., S S. Rahatekar, J. A. Fagan, J. Chun, M. L. Becker, R. R. Naik, T. Krauss, L. Carlson, J F. Kadla, P. C. Trulove, D. F. Fox, H. C. DeLong, Z. Fang, S. O. Kelley, J. W. Gilman, *Comparison of the Quality of Aqueous Disper-* sions of Single Wall Carbon Nanotubes Using Surfactants and Biomolecules, Langmuir 2008, 24, 5070-5078

Mathur, R. B., B. P. Singh, T. L. Dhami, Y. Kalra, N. Lal, R. Rao, A. M. Rao (2010) Influence of carbon nanotube dispersion on the mechanical properties of phenolic resin composites, *Polymer Composites*, 31 (2), 321-327 (February 2010)

Sellers, T. Jr., *Wood adhesive innovations and applications in North America*, Forest Products Journal, 51, 12-22 (2001)

Seo J W, E Couteau, P Umek, K Hernadi, P Marcoux, B Lukic, Cs Miko, M Milas, R Gaal and L Forro, *Synthesis and manipulation of carbon nanotubes*, New Journal of Physics 5 (2003) 120.1-120.22

Tai et al (2008) Tai, N-H., M-K Yeh, T-H Peng, Experimental study and theoretical analysis on the mechanical properties of SWNTs/phenolic composites Composites: Part B, 39, 926-932 (2008)

Wang, Q., Y. Han, Y. Wang, Y. Qin, Z-X Guo, *Effect of Surfactant Structure on the Stability of Carbon Nanotubes in Aqueous Solution*, J. Phys. Chem. B 2008, 112, 7227-7233

Wikipedia, the free encyclopedia, Carbon nanotube, http://en.wikipedia.org/wiki/Carbon_nanotube (2010)

Yan, Y., S. Zhao, J. Cui, S. B. Yang (2009). Grafting of aldehyde structures to single-walled carbon nanotubes for application in phenolic resin-based composites. Journal of Polymer Science, Part A: Polymer Chemistry 47(22): 6135-6144.

Zheng, L. X.; M J O'Connell, S K Doorn, X Z Liao, Y H Zhao, E A Akhadov, M A Hoffbauer, B J Roop, et al., *Ultralong Single-Wall Carbon Nanotubes*, Nature Materials, 3 (10): 673-676 (2004)

The invention claimed is:

1. A method of producing a composite adhesive of phenol-formaldehyde polymer and carbon nanotubes (CNTs), comprising:
    functionalising CNTs with phenolic moieties, and wherein the functionalised CNTs are formed through a supramolecular interaction or a combined supramolecular/covalent interaction between the CNTs and a source of phenolic moieties by mixing in aqueous solution,
    combining the functionalised CNTs with a phenolic compound, formaldehyde or a formaldehyde equivalent, a hydroxide base and optionally at least one lignin to form a mixture, and
    polymerising the mixture at a phenol-formaldehyde polymerization temperature to produce a matrix of a phenol-formaldehyde polymer with the functionalised CNTs therein, wherein the functionalised CNTs are covalently linked to the polymer through said phenolic moieties, and the mixture comprising a molar ratio of formaldehyde or a formaldehyde equivalent, to phenolic compound of 1.8:1 to 3.0:1.

2. The method according to claim 1, wherein the CNTs is functionalised with p-aminophenol, a poly(4-vinylphenol), a phenol-formaldehyde resin, a lignin or combinations thereof.

3. A method of producing a phenol-formaldehyde polymer adhesive comprising carbon nanotubes (CNTs) wherein the polymer is a Resol type, the method comprising:
    providing the CNTs,
    dispersing the CNTs in an alkaline aqueous solution comprising at least one phenolic polymer adhesive to produce a CNT-phenolic complex, wherein the CNT-phenolic complex is formed through a supramolecular interaction or a combined supramolecular/covalent interaction between the CNT and the phenolic polymer by mixing in aqueous solution,
    providing a polymerization mixture comprising a phenolic compound, formaldehyde or a formaldehyde equivalent, a hydroxide base and optionally at least one lignin,
    combining the CNT-phenolic polymer complex with the polymerization mixture to produce a polymerization medium, and
    raising the temperature of the medium to or above a phenol-formaldehyde polymerization temperature,
    wherein the medium is covalently bonded to produce the phenol-formaldehyde polymer, and the mixture comprising a molar ratio of formaldehyde or a formaldehyde equivalent, to phenolic compound of 1.8:1 to 3.0:1.

4. The method according to claim 3, wherein the phenolic polymer is a poly(4-vinylphenol), a phenol-formaldehyde resin, a lignin or combinations thereof.

5. The method according to claim 4, wherein the lignin is at least one of a lignosulfonate and a Kraft lignin.

6. The method according to claim 3, wherein the phenolic polymer is a lignin.

7. A phenol-formaldehyde polymer Resol type adhesive composition comprising:
    a phenolic polymer,
    a phenolic compound,
    formaldehyde or a formaldehyde equivalent,
    a hydroxide,
    carbon nanotubes (CNTs), wherein the CNTs and the phenolic polymer are in a supramolecular CNT-phenolic complex, and
    optionally at least one lignin
    wherein the composition is in aqueous form, and comprising a molar ratio of formaldehyde or a formaldehyde equivalent, to phenolic compound of 1.8:1 to 3.0:1.

8. The composition of claim 7, wherein the lignin is at least one of a lignosulfonate and a Kraft lignin.

9. The composition of claim 8, wherein the molar ratio of formaldehyde or a formaldehyde equivalent, to phenol is 2.2:1 to 2.8:1.

10. The composition of claim 7, the weight ratio of hydroxide to phenolic compound and phenolic polymer is from 0.03:1.00 to 0.30:1.00.

11. The composition of claim 10, wherein the ratio of hydroxide to phenolic compound and phenolic polymer is from 0.08:1.00 to 0.15:1.00.

12. The composition of claim 11, wherein the phenolic compound is phenol.

13. A composite adhesive comprising the phenol-formaldehyde polymer Resol type adhesive composition of claim 3, wherein the adhesive is in powder form.

14. The composite adhesive of claim 13, wherein said polymer comprises lignin.

15. The composite adhesive of claim 13, wherein the adhesive produces an OSB panel having a MOE of at least 3700 KPa.

16. The method of claim 1, further comprising a drying step producing the adhesive in powder form.

17. The method of claim 3, further comprising a drying step producing the adhesive in powder form.

18. The method of claim 1, wherein the mixing is by sonication.

19. The method of claim 3 wherein the mixing is by sonication.

* * * * *